(12) United States Patent
Hongo

(10) Patent No.: US 10,915,088 B2
(45) Date of Patent: Feb. 9, 2021

(54) OPERATING STATE DISPLAY DEVICE AND OPERATING STATE DISPLAY METHOD FOR FEED AXIS IN MACHINE TOOL

(71) Applicant: OKUMA CORPORATION, Niwa-Gun (JP)

(72) Inventor: Takumi Hongo, Niwa-Gun (JP)

(73) Assignee: Okuma Corporation, Niwa-Gun (JP)

(*) Notice: Subject to any disclaimer, the term of this patent is extended or adjusted under 35 U.S.C. 154(b) by 24 days.

(21) Appl. No.: 16/169,175

(22) Filed: Oct. 24, 2018

(65) Prior Publication Data
US 2019/0146454 A1 May 16, 2019

(30) Foreign Application Priority Data
Nov. 15, 2017 (JP) ................................ 2017-220247

(51) Int. Cl.
*G05B 19/4065* (2006.01)
*G05B 19/4062* (2006.01)

(52) U.S. Cl.
CPC ..... *G05B 19/4065* (2013.01); *G05B 19/4062* (2013.01); *G05B 2219/32128* (2013.01); *G05B 2219/35289* (2013.01)

(58) Field of Classification Search
CPC ............ G05B 19/4062; G05B 19/4065; G05B 2219/35289
See application file for complete search history.

(56) References Cited

U.S. PATENT DOCUMENTS

| | | | |
|---|---|---|---|
| 2002/0002419 A1* | 1/2002 | Yamazaki | ............... B23B 51/04 700/175 |
| 2016/0282846 A1* | 9/2016 | Nagaoka | ................ B23Q 15/22 |
| 2018/0038773 A1* | 2/2018 | Matsuo | ................ G06Q 30/016 |
| 2018/0113436 A1* | 4/2018 | Shimizu | ............... G05B 19/408 |

FOREIGN PATENT DOCUMENTS

| | | |
|---|---|---|
| JP | H05-187965 A1 | 7/1993 |
| JP | 2011-053860 A1 | 3/2011 |
| JP | 2011-247660 A1 | 12/2011 |
| JP | 2013-119212 A1 | 6/2013 |

* cited by examiner

*Primary Examiner* — Yuhui R Pan
(74) *Attorney, Agent, or Firm* — Burr & Brown, PLLC

(57) ABSTRACT

An operating state display device displays an operating state of a feed axis in a machine tool including the feed axis. The feed axis linearly moves a moving body via a ball screw with a servomotor. The operating state display device includes a passage number count unit, a use frequency calculation unit, and a display unit. The passage number count unit preliminarily divides an operating range of an axis operation of the feed axis into a predetermined number of sections and counts passage numbers of the moving body in the respective sections. The use frequency calculation unit calculates frequencies of use in respective classified types of the axis operation in each of the sections based on the counted passage numbers. The display unit displays the calculated frequencies of use in the respective classified types on a monitor in a predetermined aspect.

5 Claims, 5 Drawing Sheets

OPERATING STATE DISPLAY DEVICE AND OPERATING STATE DISPLAY METHOD FOR FEED AXIS IN MACHINE TOOL

BACKGROUND

This application claims the benefit of Japanese Patent Application Number 2017-220247 filed on Nov. 15, 2017, the entirety of which is incorporated by reference.

TECHNICAL FIELD

The disclosure relates to a device and a method to display an operating state of a feed axis in a machine tool.

RELATED ART

For a feed axis in a machine tool, a system to transmit rotational motion of a motor to a ball screw is used to drive the feed axis in many cases. In such a system, a preload is applied to the ball screw and a bearing that supports the ball screw to eliminate looseness so as to prevent backlash, thus decreasing a lost-motion amount.

However, in a machine that has operated for several years, its ball screw and bearing are abraded to release the preload, thus possibly degrading its driving mechanism. In such a state, the lost-motion amount increases, which causes malfunctions, such as a processing defect in a workpiece, or a hunting phenomenon. Accordingly, it is preferable to replace machine elements, such as the ball screw, the bearing, and a guide before deterioration and/or damage occur to cause the malfunctions. From a requirement such as improvement in an operating rate of implemented mechanical equipment, life prediction is desired to set a replacement timing in a planned and efficient way.

For example, a theoretical life prediction formula for the ball screw is expressed by the following formula (1).

[Math 1]

$$L = \left[\frac{C}{Pm \cdot fw}\right]^3 \times 10^6 \quad \text{Formula (1)}$$

L: Rated Life (rev), C: Basic Dynamic Load Rating (N), Pm: Average Axial Load (N)
fw: Operation Coefficient, for example, Quiet Operation (1.0 to 1.2), Normal Operation (1.2 to 1.5), and Operation with Impact (1.5 to 2.0)

Such a life is calculated in design from a state where the average axial load, an average rotational speed, and the operation coefficient are assumed to some extent. However, an actual operating state varies depending on users, which causes difficulties in an appropriate life prediction of the time. Therefore, various methods and devices have been proposed to solve such a problem.

For example, a method that calculates a load and a rotation speed from the actual operating state to calculate the length of life is disclosed in Japanese Unexamined Patent Application Publication No. 5-187965, Japanese Unexamined Patent Application Publication No. 2011-53860, Japanese Unexamined Patent Application Publication No. 2011-247660, and Japanese Unexamined Patent Application Publication No. 2013-119212.

Meanwhile, the operating state that affects the length of life of the machine includes factors of not only the load and the rotational speed considered in Japanese Unexamined Patent Application Publication No. 5-187965, Japanese Unexamined Patent Application Publication No. 2011-53860, Japanese Unexamined Patent Application Publication No. 2011-247660, and Japanese Unexamined Patent Application Publication No. 2013-119212, but also a use position of the feed axis. For example, for mass production, specific processing is repeated over and over, particularly, in cases where a workpiece that is small with respect to a table size is processed, and where multiple holes are drilled in an identical plane. In these cases, some parts of the feed axis are intensively used during the specific processing, and abrasion on the parts increases. Thus, the feed axis has no choice but to make replacement even though the other part is sufficiently available.

Although these situations can be improved by contriving a usage such as a periodical change of a setup position, there are many operations other than cutting, such as a move of the feed axis for an automatic tool changing (ATC) operation and an automatic pallet changing (APC) operation. Thus, it is difficult to understand the operating state in a range used in cutting where an accuracy and the like should be cared, only by the use position of the feed axis being displayed.

Therefore, in view of such problems, an object of the present disclosure is to provide an operating state display device and a method for a feed axis in a machine tool that can monitor a position where the feed axis is used in cutting and accurately understand an operating state of the feed axis.

SUMMARY

In order to achieve the above-described object, there is provided an operating state display device according to a first aspect of the disclosure. The operating state display device displays an operating state of a feed axis in a machine tool including the feed axis. The feed axis linearly moves a moving body via a ball screw with a servomotor. The operating state display device includes a passage number count unit, a use frequency calculation unit, and a display unit. The passage number count unit preliminarily divides an operating range of an axis operation of the feed axis into a predetermined number of sections and counts passage numbers of the moving body in the respective sections. The use frequency calculation unit calculates frequencies of use in respective classified types of the axis operation in each of the sections based on the counted passage numbers. The display unit displays the calculated frequencies of use in the respective classified types on a monitor in a predetermined aspect.

In the disclosure, "the type of the axis operation" means an operation mode of the axis operation discriminated depending on an object to perform the axis operation on the feed axis and an operation state (for example, a feed velocity) for the object. For example, an axis operation for cutting and an axis operation for an operation other than the cutting, such as the ATC operation and the APC operation, have different feed velocities (the latter is faster).

An operating state display device according to a second aspect of the disclosure, which is in the first aspect of the embodiment, further includes threshold calculation means that calculates thresholds indicating biases of the frequencies of use of the respective sections, based on a length of life of the feed axis and a ratio of a section number whose type of the axis operation is a cutting feed type in a total section number in the operating range, and the display means displays the calculated thresholds on the monitor together with the frequencies of use.

In order to achieve the above-described object, there is provided an operating state display method according to a third aspect of the disclosure. In the operating state display method, an operating state of a feed axis is displayed on a monitor in a machine tool including the feed axis that linearly moves a moving body via a ball screw with a servomotor. The operating state display method executes a passage number count step of preliminarily dividing an operating range of an axis operation of the feed axis into a predetermined number of sections, and counting passage numbers of the moving body in the respective sections, a use frequency calculation step of calculating frequencies of use in respective classified types of the axis operation in each of the sections based on the counted passage numbers, and a display step of displaying the calculated frequencies of use in the respective classified types on the monitor.

An operating state display method according to a fourth aspect of the disclosure, which is in the third aspect of the embodiment, further executes a threshold calculation step of calculating thresholds indicating biases of the frequencies of use of the respective sections, based on a length of life of the feed axis and a ratio of a section number whose type of the axis operation is a cutting feed type in a total section number in the operating range, and the display step displays the calculated thresholds on the monitor together with the frequencies of use.

With the disclosure, the frequencies of use for the respective sections divided in the operating range of the feed axis are displayed according to the types of the axis operation, thus being possible to monitor the position where the feed axis is used in cutting to accurately understand the operating state of the feed axis. Accordingly, the advance preparation such as the change of the setup position is ensured to avoid acceleration of replacement of a component due to a malfunction by local abrasion, thus ensuring the maximum life of the machine.

DETAILED DESCRIPTION

The following describes embodiments of the disclosure based on the drawings.

Figure 1:
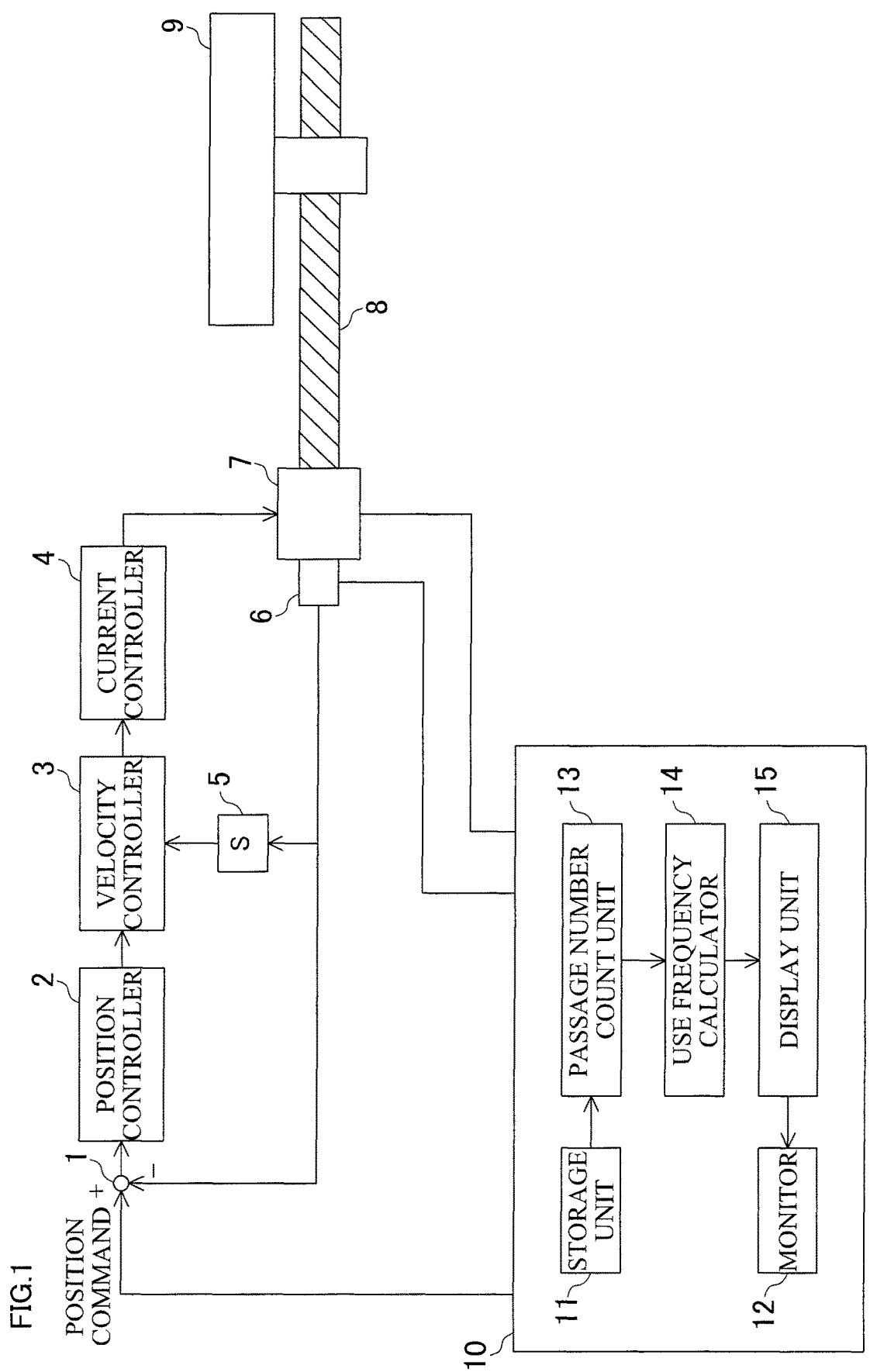
FIG. 1 is a block diagram of a position control device and an operating state display device for a feed axis.

FIG. 1 is an exemplary block diagram of a position control device for a feed axis in a machine tool to which the disclosure is applied.

In this position control device, a position command from a numerical control device (NC device) 10 and a current position from a position detector 6 mounted on a servomotor 7 are input to an adder 1, and then, a calculated position deviation is input to a position controller 2. The position controller 2 generates a speed command value corresponding to a position error amount. A velocity controller 3 generates a torque command value corresponding to the speed command value and a speed detection value obtained by calculating the current position from the position detector 6 with a differentiator 5. A current controller 4 controls a current in the servomotor 7 based on the input torque command value. The position control device includes a ball screw 8 and a moving body 9 such as a table.

The NC device 10 includes a storage unit 11 and a monitor 12 in addition to a feed axis controller (not illustrated) that outputs a position command and input means. The storage unit 11 stores the current position detected at the position detector 6, a control current value of the servomotor 7, and information used in these processes. The monitor 12 displays an operating state.

Figure 2:
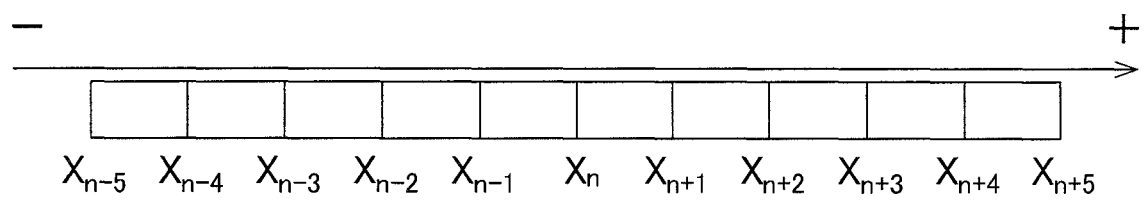
FIG. 2 is an explanatory diagram illustrating a dividing example of an operating range of the feed axis.

The storage unit 11 divides an operating range of the feed axis into a plurality of sections (here, ten sections) as illustrated in FIG. 2, and stores dividing lines and ranges of the respective sections. The ranges of the respective sections are appropriately set in a range of about one tenth to one hundredth of a stroke amount corresponding to a machine size since dividing the operating range in the minimum unit of the feed axis position causes an enormous volume of data amount. Especially, when there is a range or the like through which the moving body 9 passes only in the ATC operation and the APC operation, it is not necessary to divide the operating range at equal intervals.

Furthermore, the NC device 10 includes a passage number count unit 13, a use frequency calculator 14, and a display unit 15. The passage number count unit 13 is passage number count means that counts and accumulates the number of times the moving body 9 passes through the divided section. The use frequency calculator 14 is use frequency calculation means that, based on the counted passage number and types of an axis operation (here, a cutting feed type and a fast-feed type for the ATC operation and the like), classifies and calculates frequencies of use of the respective sections according to the types of the axis operation. The display unit 15 is display means that creates a predetermined graph from the frequencies of use classified and calculated at the use frequency calculator 14 to display it on the monitor 12. That is, the NC device 10 functions also as an operating state display device for the feed axis.

Figure 3:
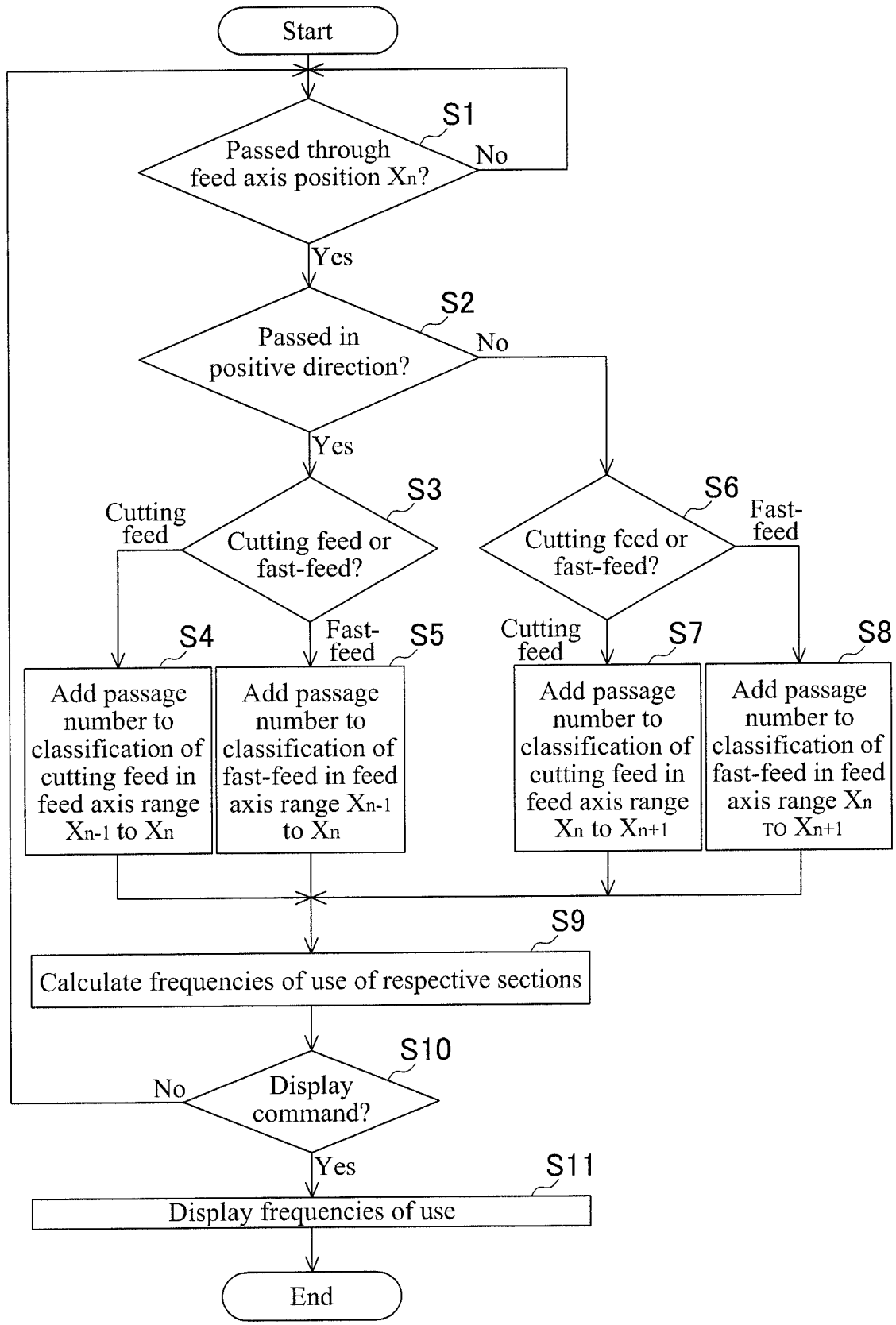
FIG. 3 is a flowchart of an operating state display method for the feed axis.

A calculation method of the operating state of the feed axis in the operating state display device configured as described above will be described based on a flowchart in FIG. 3.

At S1, it is determined whether or not the moving body 9 has passed through a feed axis position $X_n$ (a dividing line set in FIG. 2) based on position information of the position detector 6. At S2, after the passage through the dividing line has been confirmed, it is determined whether or not a moving direction is a positive direction. At S3, in the case of the move in the positive direction, it is determined whether the axis operation of the feed axis is the cutting feed type or the fast-feed type. This determination is performed by, for example, comparing a feed velocity with a preliminarily set reference velocity.

Here, when the axis operation is the cutting feed type, the passage number is added to the classification of the cutting feed in a section (a feed axis range $X_{n-1}$ to $X_n$) on a negative side of its dividing line at S4. On the other hand, when the axis operation is the fast-feed type, the passage number is added to the classification of the fast-feed in the section (the feed axis range $X_{n-1}$ to $X_n$) on the negative side of its dividing line at S5.

On the other hand, in the case of the move in the negative direction in the determination at S2, it is determined whether the axis operation of the feed axis is the cutting feed type or the fast-feed type at S6.

Here, when the axis operation is the cutting feed type, the passage number is added to the classification of the cutting feed type in a section (a feed axis range $X_n$ to $X_{n+1}$) on a positive side of its dividing line at S7. On the other hand, when the axis operation is the fast-feed type, the passage number is added to the classification of the fast-feed type in the section (the feed axis range $X_n$ to $X_{n+1}$) on the positive side of its dividing line at S8. These S1 to S8 are a passage number count step.

Next, the frequencies of use of the respective sections are classified and calculated according to the types of the axis operation, based on the counted passage number for every classification of the axis operation at S9 (a use frequency calculation step). Such a frequency of use may be calculated as a parameter obtained by multiplying the frequency of use by a coefficient in consideration of a load in an axial direction or the feed velocity, in addition to direct display of the passage number. For example, when the load in the axial direction is considered, the load in the axial direction may be estimated from a load of the servomotor 7 so that the coefficient is calculated from a ratio of the load in the axial direction to an average load assumed in design. When the feed velocity is considered, a velocity of the feed velocity may correspond to the operation coefficient in the formula (1).

Then, after a display command to the monitor 12 is input at S10, a graph where the calculated frequencies of use are discriminated for every classification is created to be displayed on the monitor 12 at S11 (a display step). When the display command is not input, the process returns to S1, and then, the count of the passage number through the feed axis position and the calculation of the frequency of use are repeated.

Figure 4:
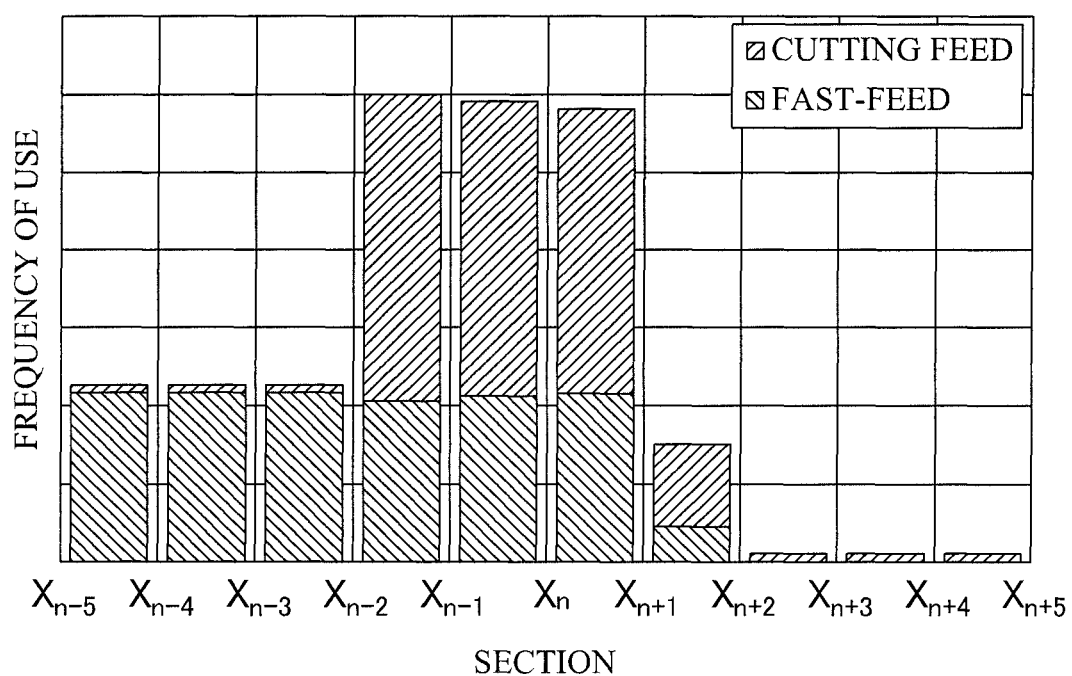
FIG. 4 is a graph illustrating a display example of an operating state of the feed axis.

FIG. 4 illustrates a display example on the monitor 12. Thus classifying the frequency of use in the cutting feed and the fast-feed types to display them for every section facilitates an examination to which position a workpiece should be moved in order to avoid a bias of an axis use position.

Thus, with the operating state display device and method for the feed axis in the above-described embodiment, the frequencies of use for the respective sections divided in the operating range of the feed axis are displayed according to the types of the axis operation, thus being possible to monitor the use position of the feed axis used in cutting to accurately understand the operating state of the feed axis. Accordingly, the advance preparation such as the change of the setup position is ensured to avoid acceleration of replacement of a component due to a malfunction by local abrasion, thus ensuring the maximum life of the machine.

Although the above-described embodiment is configured to display the frequency of use on the monitor after the input of the display command, the timing of the display is not limited to this timing. The frequency of use may be displayed on the monitor in real time without waiting the input, or the frequency of use may be periodically displayed based on when the passage number of the moving body reaches a setting value in a predetermined section, or when a total used period of the feed axis reaches a setting value.

For example, in a case of a machine tool including a plurality of feed axes such as an X-axis, a Y-axis, and a Z-axis, the frequency of use can be switchingly displayed for every feed axis, or the frequencies of use of all the feed axes can be simultaneously displayed on one screen.

Figure 5:
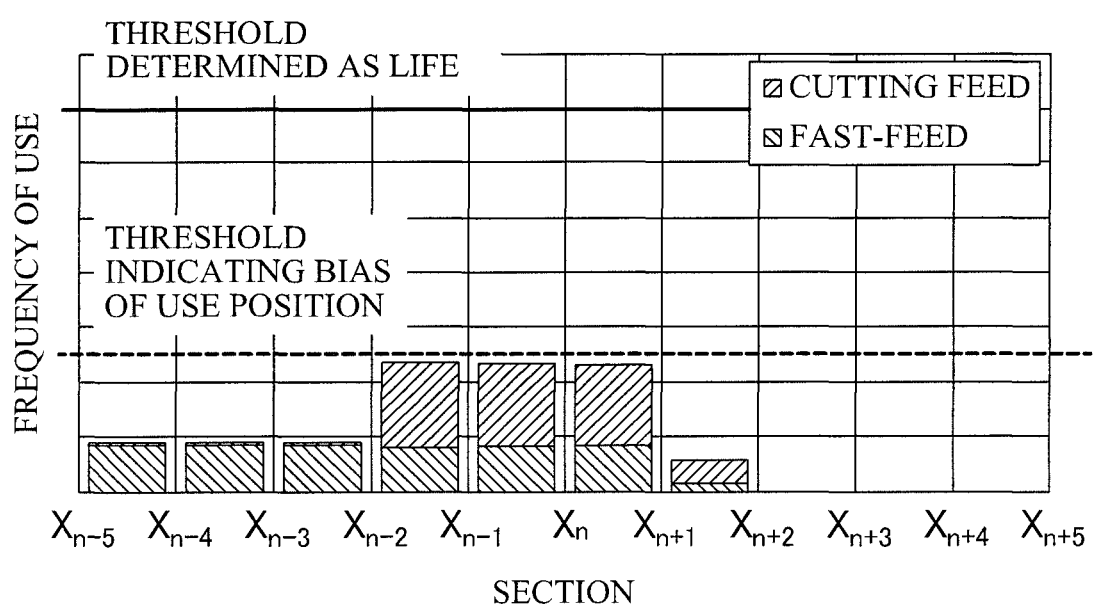
FIG. 5 is a graph illustrating a display example of the operating state of the feed axis.

Further, as illustrated in FIG. 5, thresholds can be displayed together. Here, a threshold for determining the end of its life and a threshold indicating the bias of the use position are illustrated. The threshold for determining the end of its life may use a value obtained by dividing the length of life calculated by the above-described formula (1) by section number in the operating range of the feed axis. The threshold indicating the bias of the use position may be calculated based on, for example, the following formula (2) (a threshold calculation step).

$$\text{Threshold Indicating Bias of Use Position} = \text{Threshold for determining End of Life} \times \text{Section Number Whose Ratio of Cutting Feed is Equal to or More than Certain Ratio}/\text{Total Section Number} \quad (2)$$

Thus, a guidance to uniformly use the feed axis can be performed by setting and displaying the threshold indicating the bias of the use position, corresponding to the section used for the cutting feed. The display of the threshold is not limited to the display of the two thresholds, and may be the display of the threshold indicating the bias of the use position alone.

Additionally, although the above-described embodiment configures the operating state display device for the feed axis in the NC device, the operating state display device for the feed axis may be disposed as another device different from the NC device or may be disposed as a separate device outside the machine tool. Further, the operating state of the feed axis can be displayed in units of a plurality of machine tools when one operating state display device is coupled to the plurality of machine tools by wire or wirelessly.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. An operating state display device comprising:
   a passage number count unit that preliminarily divides into a predetermined number of sections an operating range of an axis operation of a machine tool feed axis linearly moving a moving body, and counts passage numbers of the moving body in the respective sections;
   a use frequency calculation unit that calculates frequencies of use in respective classified types of the axis operation in each of the sections based on the counted passage numbers, wherein the classified types are determined by a classification being made based on whether the axis operation is a cutting feed type or another type, wherein the frequencies of use of the respective sections are classified and calculated according to types of the axis operation, based on the counted passage number for every classification of the axis operation; and
   a display unit that displays the calculated frequencies of use in the respective classified types on a monitor in a predetermined aspect.

2. The operating state display device according to claim 1, further comprising
   a threshold calculation unit that calculates thresholds indicating biases of the frequencies of use of the respective sections, based on a length of life of the feed axis and a ratio of a section number whose type of the axis operation is a cutting feed type in a total section number in the operating range, wherein
   the display unit displays the calculated thresholds on the monitor together with the frequencies of use.

3. An operating state display method comprising:
preliminarily dividing into a predetermined number of sections an operating range of an axis operation of a machine tool feed axis linearly moving a moving body, and counting passage numbers of the moving body in the respective sections;
calculating frequencies of use in respective classified types of the axis operation in each of the sections based on the counted passage numbers, and determining the classified types by a classification based on whether the axis operation is a cutting feed type or another type, wherein the frequencies of use of the respective sections are classified and calculated according to types of the axis operation, based on the counted passage number for every classification of the axis operation; and
displaying the calculated frequencies of use in the respective classified types on the monitor.

4. The operating state display method according to claim 3, further comprising:
calculating thresholds indicating biases of the frequencies of use of the respective sections, based on a length of life of the feed axis and a ratio of a section number whose type of the axis operation is a cutting feed type in a total section number in the operating range,
wherein the displaying includes displaying the calculated thresholds on the monitor together with the frequencies of use.

5. An operating state display device comprising:
a passage number count unit that preliminarily divides into a predetermined number of sections an operating range of an axis operation of a machine tool feed axis linearly moving a moving body, and counts passage numbers of the moving body in the respective sections;
a use frequency calculation unit that calculates frequencies of use in respective classified types of the axis operation in each of the sections based on the counted passage numbers, wherein the classified types are determined by a classification being made based on whether the axis operation is a cutting feed type or another type, wherein the frequencies of use of the respective sections are classified and calculated according to types of the axis operation, based on the counted passage number for every classification of the axis operation;
a velocity controller generating a torque command value corresponding to a position error amount and speed detection value obtained by calculating a current position from a position detector with a differentiator; and
a display unit that displays the calculated frequencies of use in the respective classified types on a monitor in a predetermined aspect.

* * * * *